No. 680,746. Patented Aug. 20, 1901.
T. L. TREMBLAY.
COOKING APPARATUS.
(Application filed June 14, 1901.)
(No Model.) 2 Sheets—Sheet 1.
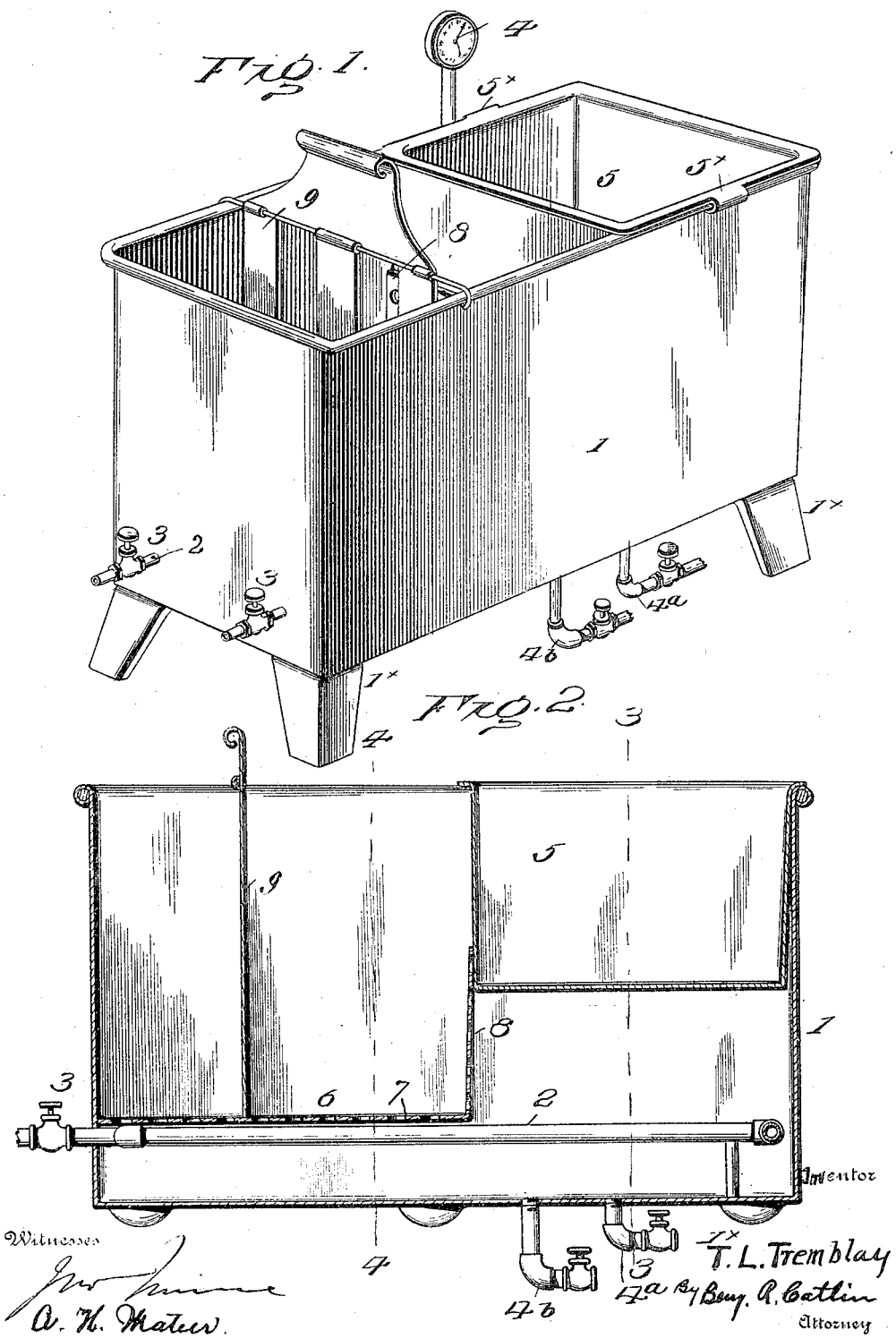

No. 680,746. Patented Aug. 20, 1901.
T. L. TREMBLAY.
COOKING APPARATUS.
(Application filed June 14, 1901.)
(No Model.)
2 Sheets—Sheet 2.
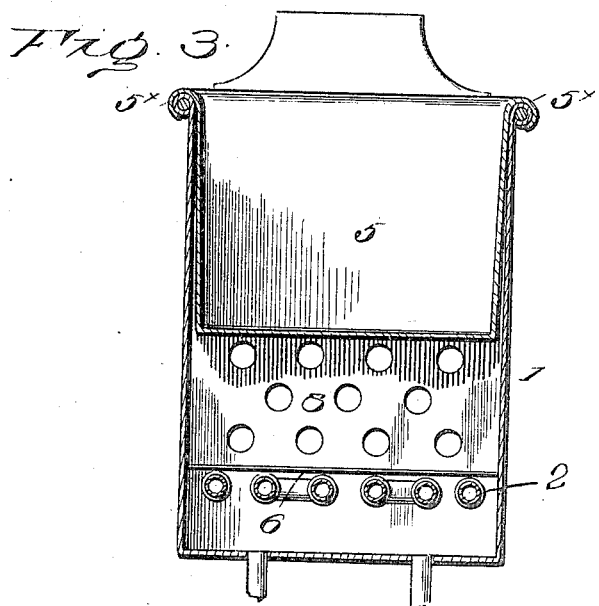
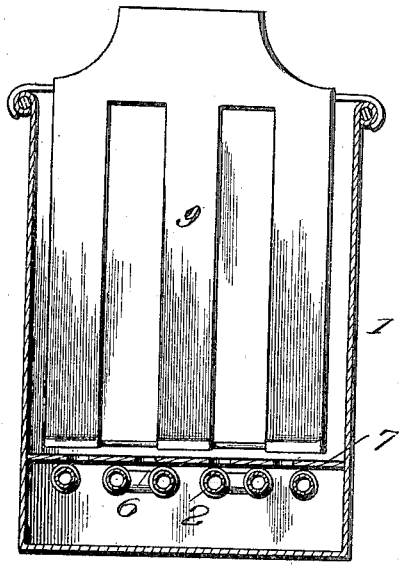
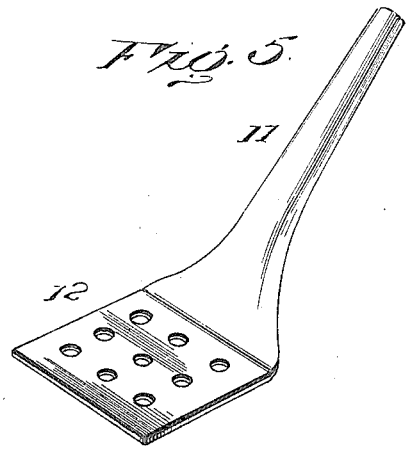
Witnesses
Inventor
T. L. Tremblay
By Benj. R Catlin
Attorney

UNITED STATES PATENT OFFICE.

THOMAS L. TREMBLAY, OF ROCHESTER, NEW YORK.

COOKING APPARATUS.

SPECIFICATION forming part of Letters Patent No. 680,746, dated August 20, 1901.

Application filed June 14, 1901. Serial No. 64,537. (No model.)

*To all whom it may concern:*

Be it known that I, THOMAS L. TREMBLAY, a resident of Rochester, in the county of Monroe and State of New York, have invented certain new and useful Improvements in Cooking Apparatus; and I do hereby declare the following to be a full, clear, and exact description of the invention, such as will enable others skilled in the art to which it pertains to make and use the same.

The invention relates to cooking devices, and has for its object to provide a simple, efficient, convenient, and economical cooking apparatus suitable for simultaneously cooking eggs in various modes and also for other uses.

The invention consists in the construction herein described and pointed out.

In the accompanying drawings, Figure 1 is a perspective view of the cooking device. Fig. 2 is a central longitudinal section. Fig. 3 is a section on line 3 3. Fig. 4 is a section on line 4 4, and Fig. 5 is a perspective of a spoon-like device for removing cooked articles.

Numeral 1 denotes a boiler, which may be supported in any usual or convenient manner, as by simply resting on a suitable base, platform, bracket, or the like.

$1^\times$ denotes feet, which can be used in any desired number or form or omitted altogether.

2 denotes a heating-coil adapted for the use either of water or steam as a heating medium.

3 denotes cocks, one being situated in an entering member of the coil and the other in an exit member.

4 denotes a timepiece, preferably connected to the boiler by a non-conductor of heat. Its use is not essential.

Heating the boiler 1 by means of a pipe circulating water or steam is not essential, though it will be preferred when such means are specially convenient. Any burner or heater customarily employed may be utilized as found desirable or convenient. In the bottom of the boiler there may be an inlet $4^a$ for water and an outlet $4^b$, if desired, though these are not essential.

5 denotes a vessel suspended in the main boiler, which may be used as an egg-poacher or for boiling any desired article or for keeping food hot. As shown, it is used for poaching eggs. Its depth is by preference about half that of the main boiler 1, though this particular depth is not essential.

The vessel 5 preferably has handles $5^\times$, which may be of such form and have sufficient elasticity to hold it on the boiler 1. They permit the vessel to be slid lengthwise on the rim of boiler 1, if desired, for the convenience of the cook.

6 denotes a horizontal partition or grate consisting of a plate, preferably perforated. Said plate has a floor 7 and may be bent to provide an upright flange or part 8. It is not essential that the latter be employed or that it be perforated; but its perforations provide for access of hot water to the adjacent vertical wall of the vessel 5. If the flange 8 is omitted, the floor can be sustained by projections from the wall of the boiler. The holes in the horizontal part of the grate 6 permit free passage of water from below about articles, such as eggs, placed on the floor 7. The size and form of the grate are such that with the coöperation of the vertical part 8 it is held securely in place without other fastening.

9 denotes an open or barred partition suspended on and movable along the rim of the boiler. It operates to prevent articles being thrown about on the grate and also to more closely confine them for convenience in lifting them with a spoon or spoon-like lifter, such as indicated in Fig. 5. It also serves to separate eggs when it is desirable to boil separate lots of them for different periods.

In operation water will be supplied in the boiler 1 and hot water or steam circulated through the heating-coil unless other means of heating are adopted.

If vessel 5 is to be used for poaching eggs or other like purposes, water will be suitably supplied to it and a boiling temperature produced in the apparatus, whereupon eggs or other food may be conveniently cooked in a cleanly manner and in suitable periods denoted by the timepiece.

Fig. 5 shows the spoon-like device having a handle 11 and a perforated plate 12, which may be used for removing articles from the boiler or from vessel 5.

Having thus described my invention, what I claim as new, and desire to secure by Letters Patent, is—

1. In combination a boiler, a vessel suspended from the boiler-rim, and a floor-partition extending horizontally between the vessel and the boiler-walls, said partition being situated above the bottom of the boiler and provided with a vertical flange bearing against the vessel to hold said partition in place.

2. In combination a boiler, a vessel suspended from the boiler-rim, and a floor-partition extending horizontally between the vessel and the boiler-walls, said partition being situated above the bottom of the boiler and provided with a vertical flange bearing against the vessel to hold said partition in place, said flange being perforated.

3. In combination a boiler, a vessel suspended from the boiler-rim, and a floor-partition extending horizontally between the vessel and the boiler-walls, said partition being situated above the bottom of the boiler, and a vertical partition suspended from the boiler-rim in the compartment having the floor.

4. In combination a boiler, a vessel suspended from the boiler-rim, and a floor-partition extending horizontally between the vessel and the boiler-walls, said partition being situated above the bottom of the boiler, and a vertical partition suspended from the boiler-rim in the compartment having the floor, said vertical partition being perforated for free circulation of water.

5. In combination a boiler, a vessel suspended from the boiler-rim, and a floor-partition extending horizontally between the vessel and the boiler-walls, said partition being situated above the bottom of the boiler, and a vertical partition suspended from the boiler-rim in the compartment having the floor, said vertical partition being adjustably supported on the boiler-rim.

6. In combination a boiler, a vessel suspended from the boiler-rim, and a floor-partition extending horizontally between the vessel and the boiler-walls, said partition being situated above the bottom of the boiler and removable, and the vessel being adjustable on the rim of the boiler.

In testimony whereof I have signed this specification in the presence of two subscribing witnesses.

THOMAS L. TREMBLAY.

Witnesses:
CHARLES N. PARKER,
W. D. WRIGHT.